Patented Sept. 29, 1942

2,297,580

UNITED STATES PATENT OFFICE 2,297,580

PROCESS FOR THE MANUFACTURE OF CARBOXYLIC ACIDS OF THE CYCLOPENTANO-POLYHYDRO - PHENANTHRENE - SERIES AND THEIR DERIVATIVES

Rupert Oppenauer, Amsterdam, Netherlands, assignor, by mesne assignments, to Roche-Organon, Inc., Nutley, N. J., a corporation of New Jersey No Drawing. Application March 10, 1938, Serial No. 195,158. In the Netherlands March 17, 1937

9 Claims. (Cl. 260—397.1)

Unsaturated cyclopentano - dimethyl - polyhydro-phenanthrene-carboxylic acids- 17 and their derivatives, were unknown until now.

However, we have noted that these substances are valuable intermediates for the synthesis of hormones.

Until now only the preparation of aetiocholanic acid from cholanic acid (Wieland, Jacobi and Schlichting: Z. physiol. Chem. 161, 80, 1926) and of oxy-aetio-allo-cholanic acid from oxy-allo-cholanic acid (Dalmer, v. Werder, Honigmann, and Heyns: Ber. 68, 1814, 1935) were known.

However the corresponding unsaturated acids could not be obtained when oxidizing oxy-3-bisnor-cholenic acid (Fernholz:Ber. 67, 2027, 1934; Butenandt et al.: Ber. 67, 1611, 2085, 1934), in which case pregnene-ol-3-one-20 was formed.

In the oxidation of cholic acid (Shimizu, Kazuno: Z. physiol. Chem. 244, 167, 1936), the side-chain was shortened to a still smaller extent, as here only the bisnor-cholic acid was obtained.

In conclusion the oxidation of lithocholic acid to oxy-bis-nor-cholanic acid (Reindel, Niederländer: Ber. 68, 1969, 1935) can be reported.

Now we have found that by oxidation of unsaturated α-(cyclopentano-dimethyl-poly-hydrophenanthrene)-propionic acids or their derivatives unsaturated cyclopentano-dimethyl-polyhydro-phenanthrene-carbonic acids and their derivatives, can be obtained, thus disclosing a new way for the synthetic preparation of hormones.

The method followed is developed from the above-mentioned method of Wieland, Schlichting and Jacobi. In the present process however the starting materials are different viz. unsaturated acids which moreover may be substituted. It was found necessary, in this case, to protect all parts of the molecule liable to undesired changes by the oxidizing agent against such changes. This may efficiently be done by addition of a halogen or a hydrogen halide to the double bond(s) and if necessary by acylation of the hydroxyl group(s).

This process is not restricted to the preparation of the cyclopentano-dimethyl-dodecahydrophenanthrene-carboxylic acid-17, but may also be successfully applied to derivatives of this acid. As derivatives must be regarded not only the substitution products, for instance halogen-, hydroxy- and keto compounds, and compounds with an etherlike bound oxygen atom but also e. g. the compounds esterified in the carboxyl groups and the compounds esterified or alkoxylated in the substituents.

The starting materials, if desired esterified according to known methods, are treated with a Grignard compound, water is split off if desired, followed by reacylation, addition of a halogen or a hydrogen halide to the double bonds, and oxidation with known agents, as e. g. chromic anhydride, potassium permanganate. Subsequently the halogen and the hydrogen halide is removed and from the reaction mixture the esters e. g. of cyclopentano-dimethyl-dodecahydro-polyhydroxy-phenanthrene-carbonic a c i d can be isolated.

Also the substances obtained can be subjected to a hydrolysis, by which e. g. the above-mentioned acid is obtained with free hydroxyl groups.

On the other hand the acid formed may be esterified in the carboxyl group. The unsaturated compounds obtained in this way can be reduced according to known methods.

In carrying out the process as described it has appeared unnecessary to isolate the carbinol formed by the treatment with a Grignard compound: The following treatments can be carried out with the reaction-mixture. This increases the yield.

*Examples*

1. To a Grignard's solution prepared from 8 g. of magnesium splinters and 45 g. of bromobenzene in absolute ether 10 g. of acetoxy-3-Δ5,6-bis-norcholenic acid (M. P. 235° C.) is added. The ether is substituted by toluene, after which the mixture is heated for 2-7 hours on a boiling waterbath. Then the magnesium-compound is decomposed with ice-cold dilute hydrochloric acid and the liquid treated with steam. The reaction product which is left in the residue is taken up in ether. After evaporation of the solvent a clear yellow syrup remains, which is taken up in 40 ml. dry pyridine; then 10 g. of acetic anhydride are added, and the mixture is left one day at 20° C. Then it is poured out into water, and by washing with water the pyridine and the excess of acetic anhydride are removed.

The remaining oil can be crystallized by grinding with petroleum ether. Then the acylated diol is recrystallized two or more times from a small amount of ethanol. The yield is 7 g. This compound crystallizes in thin leaflets or in needles and melts first at 176° C., solidifies again on further heating to melt again at 186–188.50° C. (corr.).

To a solution of these 7 g. of acylated diol in ether 2.12 g. of bromine are added. After evaporation of the ether the residue is dissolved in 500 ml. glacial acetic acid. To this solution which has been heated to 45–55° C. a solution of 15 g. of chromic anhydride in 15 ml. water and 100 ml. glacial acetic acid is added drop by drop, under vigorous stirring; then the temperature is kept at the same level for another 2–3 hours. After cooling the product of the reaction is taken up in ether and 5 g. of powdered zinc and 50 ml. glacial acetic acid are added. After evaporating the ether the mixture is thoroughly shaken for some time on a boiling water-bath. After cooling the zinc and zinc bromide are removed by filtration, and the product of the reaction is taken up in ether. After a few washings with water the ethereal solution of the acetoxy-3-Δ-5,6-aetio-cholenic acid is shaken with a 10% solution of sodium-hydroxide by which the sodium salt precipitates. This is separated by centrifugation, then acidified and taken up in ether. After drying with anhydrous sodium sulphate the ether is evaporated, and the residue recrystallized from glacial acetic acid.

The acetoxy-3-Δ-5,6-aetio cholenic acid crystallizes in needles or in leaflets; M. P. 243–245° C. (corr.) Yield 0.5–1 g.

Methylester, crystallized from petroleum ether, M. P. 153–154° C. (corr.)

The acylated product is saponified by boiling with alcoholic sodium hydroxide solution. The free oxy-3-Δ-5,6-aetiocholenic acid is extracted with ether and recrystallized from glacial acetic acid. Yield quantitative 15 M. P. 280–288° C. (corr.) with decomposition.

Methylester of oxy-3-Δ-5,6-aetiocholenic acid recrystallized from methanol, M. P. 181–183° C. (corr.)

2. 7.8 g. of (acetoxy-3-Δ5,6-aetio-cholenyl)-1-methyl-1-diphenyl-2,2-ethene (M. P. 222° C. (corr.), leaflets recrystallized from glacial acetic acid) are dissolved in 20 ml. chloroform. To this a solution of 0.9 ml. bromine in 15 ml. chloroform is slowly added under cooling. Then 100 ml. glacial acetic acid are added and the chloroform is evaporated in vacuo. The dibromide is only sparingly soluble, and separates in colourless crystals (M. P. 176–178° C. (corr.), with decomposition).

Another 160 ml. glacial acetic acid are added and then a solution of 9.1 g. of chromic anhydride in 5 ml. water and 125 ml. glacial acetic acid is slowly added (within one hour), keeping the temperature at 45° C. and with stirring. The mixture is stirred further at the same temperature, which causes the crystals to dissolve again slowly. Then the mixture is left to stand at 45° C. for another number (about 15) of hours. Now the glacial acetic acid is evaporated in vacuo at a bath temperature not exceeding 35° C. To the residue water is added under cooling and dilute sulfuric acid until the reaction is acid to congo; then extraction with ether follows. The ethereal solution is washed with sulfuric acid and water, and after addition of 10 g. of powdered zinc and a small amount of glacial acetic acid the ether is evaporated.

The residue, after further addition of a small amount of powdered zinc, is heated for 15 minutes on a water bath. Now the reaction mixture is distributed between dilute sulfuric acid and ether; the ethereal solution is washed with sulfuric acid and water after which the acids are extracted with a concentrated solution of sodium carbonate. Further purification as described in Example 1.

The yield is 0.6 g. of crystals with a M. P. 242–244° C. (corr.).

What I claim is:

1. The methylester of hydroxy-3-aetio cholenic-acid, having the formula $C_{21}H_{32}O_3$, the structure:

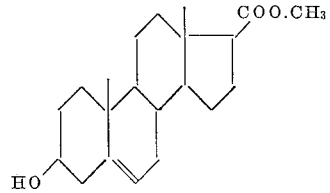

and melting point 181–183° C. (corr.), soluble in ether, insoluble in water.

2. A process of converting compounds of the unsaturated cyclopentanodimethyl-10.13-polyhydrophenanthrene series having the grouping

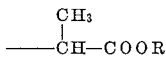

in which R represents a radical from the group consisting of hydrogen and alkyl, attached at the 17-position to the corresponding carboxylic acids-17, the compounds both before and after the conversion having the double bond attached to the carbon atom $C_5$ and having attached to the carbon atom $C_3$ a substituent from the class consisting of hydroxyl, acyloxyl, alkoxyl, halogen and keto oxygen, said process comprising acting upon the original compounds with a Grignard reagent, decomposing the compounds formed thereby, protecting free secondary hydroxyl groups and nuclear double bonds, treating the products with an oxidizing agent, regenerating the double bonds, and separating the resulting acids from the reaction mixture.

3. A process of converting compounds of the unsaturated cyclopentanodimethyl-10.13-polyhydrophenanthrene series having the grouping

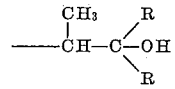

in which R represents a radical from the group consisting of alkyl and aryl, attached at the 17-position to the corresponding carboxylic acids-17, the compounds both before and after the conversion having the double bond attached to the carbon atom $C_5$ and having attached to the carbon atom $C_3$ a substituent from the class consisting of hydroxyl, acyloxyl, alkoxyl, halogen and keto oxygen, said process comprising protecting free secondary hydroxyl groups and nuclear double bonds, treating the products with an oxidizing agent, regenerating the double bonds, and separating the resulting acids from the reaction mixture.

4. A process of converting compounds of the unsaturated cyclopentanodimethyl-10.13-polyhydrophenanthrene series having the grouping

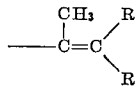

in which R represents a radical from the group consisting of alkyl and aryl, attached at the 17-positon to the corresponding carboxylic acids-17, the compounds both before and after the conversion having the double bond attached to the carbon atom $C_5$ and having attached to the carbon atom $C_3$ a substituent from the class consisting of hydroxyl, acyloxyl, alkoxyl, halogen and keto oxygen, said process comprising protecting free secondary hydroxyl groups and nuclear double bonds, treating the products with an oxidizing agent, regenerating the double bonds, and separating the resulting acids from the reaction mixture.

5. The process of claim 2 further characterized in that the reaction mixture obtained by decomposition of said Grignard compound is treated with a dehydrating agent to split water from the carbinol formed by such decomposition.

6. The process which comprises submitting acetoxy-3-bisnor-cholen-5-ic acid to the action of a Grignard reagent, decomposing the compound formed thereby, protecting free secondary hydroxy groups and nuclear double bonds, treating the product with an oxidizing agent, regenerating the double bond, and separating the acid formed from the reaction mixture.

7. The process which comprises submitting acetoxy-3-bisnor-cholen-5-ic acid to the action of a Grignard reagent, decomposing the compound formed thereby, treating with a dehydrating agent to split water from the carbinol formed by such decomposition, protecting free secondary hydroxy groups and nuclear double bonds in the product so obtained, treating the product with an oxidizing agent, regenerating the double bonds and separating the acid formed from the reaction mixture.

8. The process which comprises treating hydroxy-3-bisnor-cholen-5-yl-diphenyl-carbinol to protect secondary hydroxy groups and nuclear double bonds, treating the product with an oxidizing agent, regenerating the double bonds, and separating the acid formed from the reaction mixture.

9. The process which comprises treating acetoxy-3-$\Delta$-5,6 - aetiocholenyl - 1 - methyl-1-diphenyl-2,2-ethene to protect nuclear double bonds, treating the product with an oxidizing agent, regenerating the double bonds, and separating the acid formed from the reaction mixture.

RUPERT OPPENAUER.